US011235422B2

(12) United States Patent
Pan et al.

(10) Patent No.: US 11,235,422 B2
(45) Date of Patent: Feb. 1, 2022

(54) METHOD FOR SMOOTHING THE SURFACE OF A LASER WELD JOINT

(71) Applicant: GM GLOBAL TECHNOLOGY OPERATIONS LLC, Detroit, MI (US)

(72) Inventors: Yu Pan, Beijing (CN); David Yang, Shanghai (CN); Wu Tao, Tianmen (CN); Paolo Novelletto, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 16/484,010

(22) PCT Filed: Feb. 9, 2017

(86) PCT No.: PCT/CN2017/000146
§ 371 (c)(1),
(2) Date: Aug. 6, 2019

(87) PCT Pub. No.: WO2018/145221
PCT Pub. Date: Aug. 16, 2018

(65) Prior Publication Data
US 2020/0094350 A1 Mar. 26, 2020

(51) Int. Cl.
*B23K 26/22* (2006.01)
*B23K 26/082* (2014.01)
(Continued)

(52) U.S. Cl.
CPC .......... *B23K 26/22* (2013.01); *B23K 26/082* (2015.10); *B23K 26/0876* (2013.01);
(Continued)

(58) Field of Classification Search
CPC .......... B23K 2103/04; B23K 2103/10; B23K 2103/15; B23K 26/082; B23K 26/0876; B23K 26/22; B23K 26/244
(Continued)

(56) References Cited

U.S. PATENT DOCUMENTS

2012/0160815 A1* 6/2012 Hayashimoto ....... B23K 26/244
219/121.64

FOREIGN PATENT DOCUMENTS

CN 105108346 A 12/2015
CN 106271073 A 1/2017
(Continued)

OTHER PUBLICATIONS

International Search Report and Written Opinion for application No. PCT/CN2017/000146 dated Nov. 2, 2017, 8 pages.

*Primary Examiner* — Dana Ross
*Assistant Examiner* — Joseph W Iskra
(74) *Attorney, Agent, or Firm* — Vivacqua Crane PLLC

(57) ABSTRACT

A method for joining together metal workpiece (12,14 or 12,150, 14) includes forming a laser weld joint (66) in a workpiece stack-up (10) that fusion welds two or more overlapping metal workpiece (12,14 or 12,150 or 14) together. The laser weld joint (66) has an initial top surface (76). Once the laser weld joint (66) is formed, the method calls for impinging the laser weld joint (66) with a laser beam (24) and moving the laser beam (24) along the initial joint (66) including the initial top surface (76). The laser beam (24) is eventually removed from the laser weld joint (66) to allow the melted upper portion (78) of the joint (66) to resolidify and provide the laser weld joint (66) with a modified top surface (84) that is smoother than the initial top surface (76). By providing the laser weld joint with a smoother modified top surface, residual stress concentration points are removed and the laser weld joint is less liable to damage seal strips.

18 Claims, 4 Drawing Sheets

(51) Int. Cl.
    *B23K 26/244*     (2014.01)
    *B23K 26/08*     (2014.01)
    *B23K 103/08*     (2006.01)
    *B23K 103/10*     (2006.01)
    *B23K 103/04*     (2006.01)

(52) U.S. Cl.
    CPC ........ *B23K 26/244* (2015.10); *B23K 2103/04* (2018.08); *B23K 2103/10* (2018.08); *B23K 2103/15* (2018.08)

(58) Field of Classification Search
    USPC .................................................. 219/121.64
    See application file for complete search history.

(56) References Cited

FOREIGN PATENT DOCUMENTS

| | | | |
|---|---|---|---|
| JP | 2015208762 | A | 11/2015 |
| WO | 2016032416 | A1 | 3/2016 |
| WO | 2016172976 | A1 | 11/2016 |
| WO | WO2016172976 | * | 11/2016 |
| WO | 2016192039 | A1 | 12/2016 |

* cited by examiner

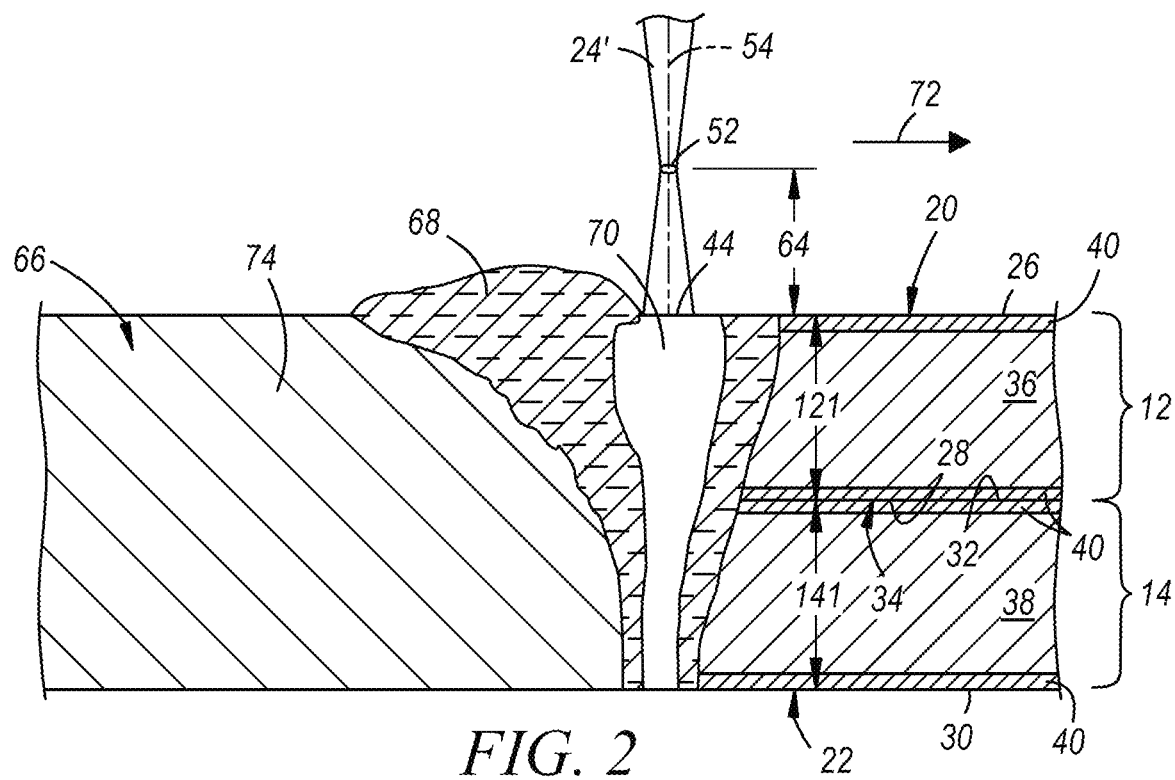
FIG. 2
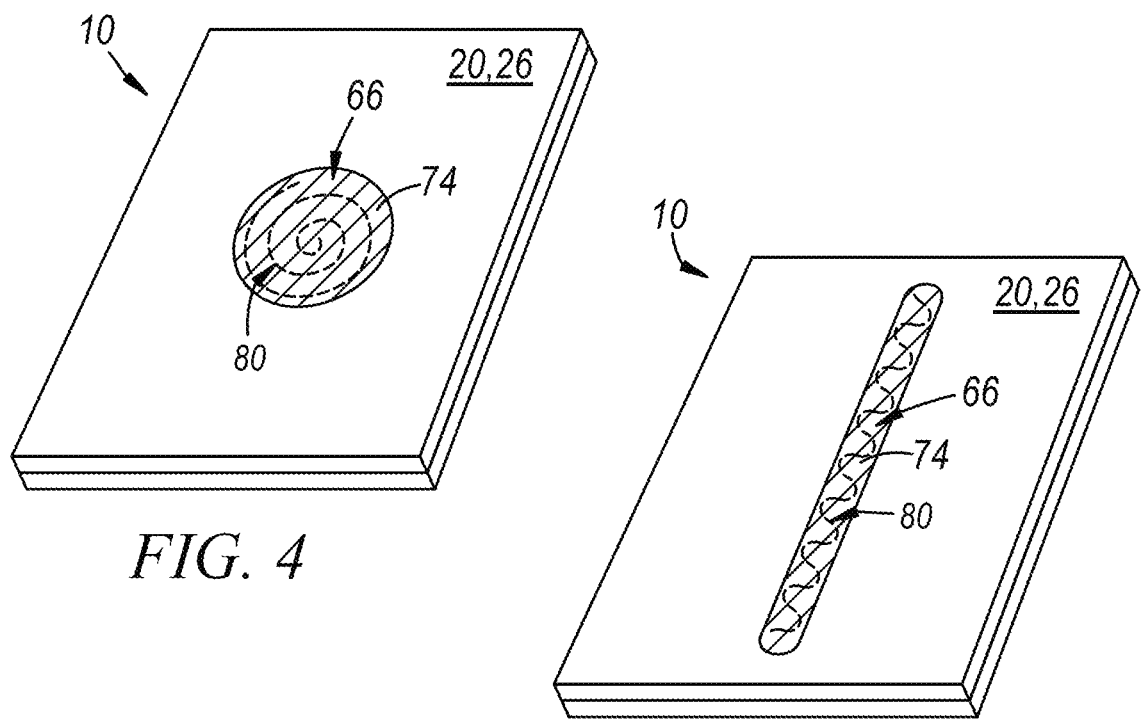
FIG. 4
FIG. 5

METHOD FOR SMOOTHING THE SURFACE OF A LASER WELD JOINT

TECHNICAL FIELD

The technical field of this disclosure relates generally to a method for joining together metal workpieces and, more particularly, to a method for smoothing the top surface of a laser weld joint by using a laser beam to melt an upper portion of the laser weld joint that includes the top surface.

BACKGROUND

Laser welding is a metal joining process in which a laser beam is directed at an assembly of stacked-up metal workpieces to provide a concentrated heat source capable of effectuating a weld joint between the constituent metal workpieces. In general, complimentary flanges or other bonding regions of two or more metal workpieces are first aligned, fitted, and stacked relative to one another such that their faying surfaces overlap and confront to establish one or more faying interfaces. A laser beam is then directed at an accessible top surface of the workpiece stack-up within a welding region spanned by the overlapping portion of the workpieces. The heat generated from the absorption of energy from the laser beam initiates melting of the metal workpieces and establishes a molten metal weld pool within the workpiece stack-up. The molten metal weld pool penetrates into the stack-up and intersects at least one, and usually all, of the established faying interfaces. And, if the power density of the laser beam is high enough, a keyhole is produced beneath a beam spot of the laser beam within the molten metal weld pool. A keyhole is a column of vaporized metal, which may include plasma, derived from the metal workpieces. The keyhole is an effective absorber of energy from the laser beam, thus allowing for deep and narrow penetration of molten workpiece metal into the stack-up.

The molten metal weld pool and, if present, the keyhole, are created in very short order once the laser beam impinges the top surface of the workpiece stack-up. After the metal workpieces are initially melted, the beam spot of the laser beam may be advanced relative to the top surface of the workpiece stack-up, which has conventionally involved moving the laser beam along a beam travel pattern of a relatively simple or complex geometrical profile as projected onto the top surface of the stack-up. As the laser beam is advanced along the top surface of the stack-up, molten workpiece metal from the weld pool flows around and behind the advancing beam spot within the workpiece stack-up. This penetrating molten workpiece metal quickly cools and solidifies in the wake of the advancing laser beam into resolidified metal workpiece material. The transmission of the laser beam at the top surface of the workpiece stack-up is eventually ceased once the laser beam has finished tracking the beam travel pattern, at which time the keyhole collapses, if present, and any molten workpiece metal still remaining within the stack-up solidifies. The collective resolidified composite workpiece material obtained by operation of the laser beam constitutes a laser weld joint that autogenously fusion welds the overlapping metal workpieces together.

Many industries use laser welding as part of their manufacturing practice including the automotive, aviation, maritime, railway, and building construction industries, among others. Laser welding is an attractive joining process because it requires only single side access, can be practiced with reduced flange widths, and results in a relatively small heat-affected zone within the stack-up assembly that minimizes thermal distortion in the metal workpieces. In the automotive industry, for example, laser welding can be used to join together metal workpieces during the manufacture of the body-in-white (BIW) as well as finished hang-on parts that are installed on the BIW prior to painting. Some specific instances where laser welding may be used include the construction and attachment of load-bearing body structures within the BIW such as rail structures, rockers, A-, B-, and C-pillars, and underbody cross-members. Other specific instances where laser welding may also be used include non-load-bearing attachments within the BIW, such as the attachment of a roof to a side panel, and to join overlying flanges encountered in the construction of the doors, hood, and trunk.

The practice of laser welding can present challenges for certain types of metal workpieces. For example, when the metal workpieces included in the workpiece stack-up are steel workpieces, aluminum workpieces, or magnesium workpieces, the turbulence produced in the molten metal weld pool during the laser welding process and the tendency for gasses to be trapped within the weld pool, which leads to porosity defects when the molten workpiece material cools and solidifies, can cause a disturbed and roughened top surface in the ultimately-formed laser weld joint. A coarse top surface of the laser weld joint not only gives the appearance of a poor-quality weld joint, even in instances where the weld joint is structurally sound and has satisfactory mechanical properties, but it can also create points of residual stress concentration that are susceptible to cracking and, in particular, stress corrosion cracking when the joint is subjected to a tensile load in a corrosive environment. A coarse top surface of the laser weld joint may also damage seal strips that are may be applied over the joint when the joint is located on a vehicle door or along a door or window opening of the BIW.

SUMMARY OF THE DISCLOSURE

An embodiment of a method of joining together metal workpieces may include several steps. In a first step, a laser weld joint is formed in a workpiece stack-up that fusion welds two or more overlapping metal workpieces together. The laser weld joint extends into the workpiece stack-up from a top surface of the stack-up towards a bottom surface of the stack-up and intersects at least one faying interface established between the top and bottom surfaces of the workpiece stack-up. The originally-formed laser weld joint has an initial top surface adjacent to the top surface of the workpiece stack-up. In a second step, the laser weld joint is impinged by a laser beam and the laser beam is moved along the initial top surface of the laser weld joint to melt an upper portion of the laser weld joint. The melted upper portion of the laser weld joint includes the initial top surface. In a third step, the laser beam is removed from the laser weld joint to allow the upper portion of the joint to resolidify and provide the the laser weld joint with a modified top surface. The modified top surface of the laser weld joint is smoother than the initial top surface.

The workpiece stack-up of the method of this particular embodiment may include two or three overlapping metal workpieces. In one implementation of the method, each of the two or three overlapping metal workpieces is a steel workpieces. In another implementation of the method, each of the overlapping metal workpieces is an aluminum workpiece. And in still another implementation of the method, each of the overlapping metal workpieces is a magnesium workpiece. Moreover, the laser weld joint originally formed in the workpiece stack-up may be a laser spot weld joint or a laser seam weld joint, regardless of the number of overlapping metal workpieces included in the stack-up and the composition of those metal workpieces. The initial top surface of the laser weld joint, whether a spot or a seam weld joint, or some other structure, may have a surface roughness (Ra) of 5 µm to 10 µm, and the subsequently-derived modified top surface of the laser weld joint, which is lower than that of the initial top surface, may have a surface roughness (Ra) of 0.5 µm to 3 µm.

The laser beam that impinges and is moved along the initial top surface of the laser weld joint to ultimately melt the upper portion of the weld joint may be a solid-state laser beam. Such a laser beam may be directed at and moved along the initial top surface of the laser weld joint by a remote laser welding apparatus. In so doing, for example, the laser beam may be moved along the initial top surface of the laser weld joint at a travel speed that ranges from 50 m/min to 130 m/min. And, during the time the laser beam is being moved along the initial top surface of the laser weld joint, the power level of the laser beam may range from 1 kW to 3 kW and the focal position of the laser beam may range from 0 mm to −50 mm. The melted upper portion of the laser weld joint may of course be realized with other types of laser welding apparatuses and different laser beam characteristics. In any event, the upper portion of the laser weld joint that is melted by the laser beam may, in certain embodiments, constitute between 10 vol % and 30 vol % of the laser weld joint.

The laser weld joint that is originally formed within the workpiece stack-up and which fusion welds two or more metal workpieces together may be obtained by using a laser beam from the same or a different laser welding apparatus. More specifically, the laser weld joint may be formed by first directing a laser beam at the top surface of the workpiece stack-up, thus creating a molten metal weld pool that penetrates into the workpiece stack-up and intersects the at least one faying interface established between the top and bottom surfaces of the stack-up. Once the molten metal weld pool is created, a beam spot of the laser beam is advanced relative to the top surface of the workpiece stack-up along a beam travel pattern to translate the molten metal weld pool along a corresponding route within the workpiece stack-up so as to form the laser weld joint. In this way, the laser weld joint is comprised or resolidified composite workpiece material derived from each of the metal workpieces penetrated by the molten metal weld pool. The formation of the laser weld joint, moreover, may be conducted in keyhole welding mode. This involves producing a keyhole beneath the beam spot of the laser beam. The keyhole is surrounded by the molten metal weld pool. As such, the keyhole is translated within the workpiece stack-up along with the molten metal weld pool during advancement of the beam spot of the laser beam along the beam travel pattern.

Another embodiment of a method of joining together metal workpieces may include several steps. In a first step, a workpiece stack-up is provided that includes two or more metal workpieces that overlap to define a welding region. The welding region of the workpiece stack-up has a top surface and a bottom surface and further establishes a faying interface between each pair of adjacent metal workpieces includes in the stack-up. All of the two or more metal workpieces in the workpiece stack-up are steel workpieces, aluminum workpieces, or magnesium workpieces. In a second step, a first laser beam is directed at the top surface of the workpiece stack-up to create a molten metal weld pool that penetrates into the workpiece stack-up and intersects at least one faying interface established between the top and bottom surfaces of the stack-up. In a third step, a beam spot of the first laser beam is advanced relative to the top surface of the workpiece stack-up along a beam travel pattern to translate the molten metal weld pool along a corresponding route within the workpiece stack-up so as to form a laser weld joint comprised or resolidified composite workpiece material derived from each of the metal workpieces penetrated by the molten metal weld pool. The originally-formed laser weld joint has an initial top surface adjacent to the top surface of the workpiece stack-up. In a fourth step, the laser weld joint is impinged by a second laser beam and the second laser beam is moved along the initial top surface of the laser weld joint to melt an upper portion of the weld joint including the initial top surface. In a fifth step, the second laser beam is removed from the laser weld joint to allow the upper portion of the joint to resolidify and provide the the laser weld joint with a modified top surface. The modified top surface of the laser weld joint is smoother than the initial top surface.

The aforementioned embodiment of the method of joining together metal workpieces may be further defined. The workpiece stack-up may, for example, include two or three overlapping metal workpieces, all of which are steel workpieces, aluminum workpieces, or magnesium workpieces. In another implementation, the initial top surface of the laser weld joint may have a surface roughness (Ra) of 5 µm to 10 µm, and the subsequently-derived modified top surface of the laser weld joint, which is lower than that of the initial top surface, may have a surface roughness (Ra) of 0.5 µm to 3 µm, although situations may certainly exist where the surface roughness measurements of the initial and modified top surfaces of the laser weld joint, respectively, fall outside of one or both of those ranges. Still further, the second laser beam, which is used to melt the upper portion of the laser weld joint, may be a solid state-laser beam that is directed at and moved along the initial top surface of the laser weld joint by a remote laser welding apparatus. In so doing, the second laser beam may be moved along the initial top surface of the laser weld joint at a travel speed that ranges from 50 m/min to 130 m/min. And, during the time the second laser beam is being moved along the initial top surface of the laser weld joint, the power level of the second laser beam may range from 1 kW to 3 kW and the focal position of the second laser beam may range from 0 mm to −50 mm.

Still another embodiment of a method of joining together metal workpieces may include several steps. In a first step, a workpiece stack-up is provided that includes two or three metal workpieces that overlap to define a welding region. The welding region of the workpiece stack-up has a top surface and a bottom surface and further establishes a faying interface between each pair of adjacent metal workpieces includes in the stack-up. All of the two or more metal workpieces in the workpiece stack-up are steel workpieces, aluminum workpieces, or magnesium workpieces. In a second step, a scanning optic laser head of a remote laser welding apparatus is operated to direct a first laser beam at the top surface of the workpiece stack-up and, additionally, to move a beam spot of the first laser beam relative to the top surface of the stack-up within the welding region along a beam travel pattern to translate a keyhole and a surrounding molten metal weld pool along a corresponding route within the workpiece stack-up. Such translation of the keyhole and the surrounding molten metal weld pool forming a laser weld joint that extends into the workpiece stack-up and intersects each faying interface established between the top and bottom surfaces of the workpiece stack-up to fusion weld the two or three metal workpieces together. The originally-formed laser weld joint has an initial top surface adjacent to the top surface of the workpiece stack-up. In a third step, the scanning optic laser head of the remote laser welding apparatus is operated, again, to impinge the initial top surface of the laser weld joint with a second laser beam and, additionally, to move the second laser beam along the initial top surface of the laser weld joint so as to melt an upper portion of the laser weld joint including the initial top surface of the weld joint. The upper portion that is melted by the second laser beam may constitute between 10 vol % and 30 vol % of the laser weld joint. In a fourth step, the second laser beam is removed from the laser weld joint to allow the upper portion of the joint to resolidify and provide the the laser weld joint with a modified top surface. The modified top surface of the laser weld joint is smoother than the initial top surface.

The first laser beam and second laser beam employed in the aforementioned embodiment of the method of joining together metal workpieces may each be a solid-state laser beam. In addition, the first laser beam may be moved relative to the top surface of the workpiece stack-up along its beam travel pattern at a travel speed that ranges from 2 m/min to 50 m/min while a power level of the first laser beam ranges from 2 kW to 6 kW and a focal position of the first laser beam ranges from +10 mm to −10 mm. On the other hand, the second laser beam may be moved along the initial top surface of the laser weld joint at a travel speed that ranges from 50 m/min to 130 m/min while a power level of the second laser beam ranges from 1 kW to 3 kW and a focal position ranges from 0 mm to −50 mm. In some circumstances, however, one of the first laser beam or the second laser beam, or both of the laser beams, may fall outside of one or more of the laser beam characteristics just recited.

BRIEF DESCRIPTION OF THE DRAWINGS

FIG. 2 is a cross-sectional view of a workpiece stack-up during the formation of a laser weld joint according to one aspect of the present disclosure in which a first laser beam is directed towards the workpiece stack-up and maneuvered relative to a top surface of the stack-up by a scanning optic laser head of a remote laser welding apparatus, and wherein the workpiece stack-up assembly includes two overlapping metal workpieces;

FIG. 4 is an elevated perspective view of a workpiece stack-up that shows a laser spot weld joint that fusion welds the overlapping workpieces together along with a beam travel pattern that, according to one aspect of the present disclosure, may be traced by a second laser beam in order to melt an upper portion of the laser spot weld joint including an initial top surface of the laser weld joint, and wherein the beam travel pattern shown here is comprised of a single spiral weld path;

FIG. 5 is an elevated perspective view of a workpiece stack-up that shows a laser seam weld joint that fusion welds the overlapping workpieces together along with a beam travel pattern that, according to one aspect of the present disclosure, may be traced by a second laser beam in order to melt an upper portion of the laser seam weld joint including an initial top surface of the laser weld joint, and wherein the beam travel pattern shown here is comprised of a single continuous sinusoidal weld path;

DETAILED DESCRIPTION

Figures 1, 1A:
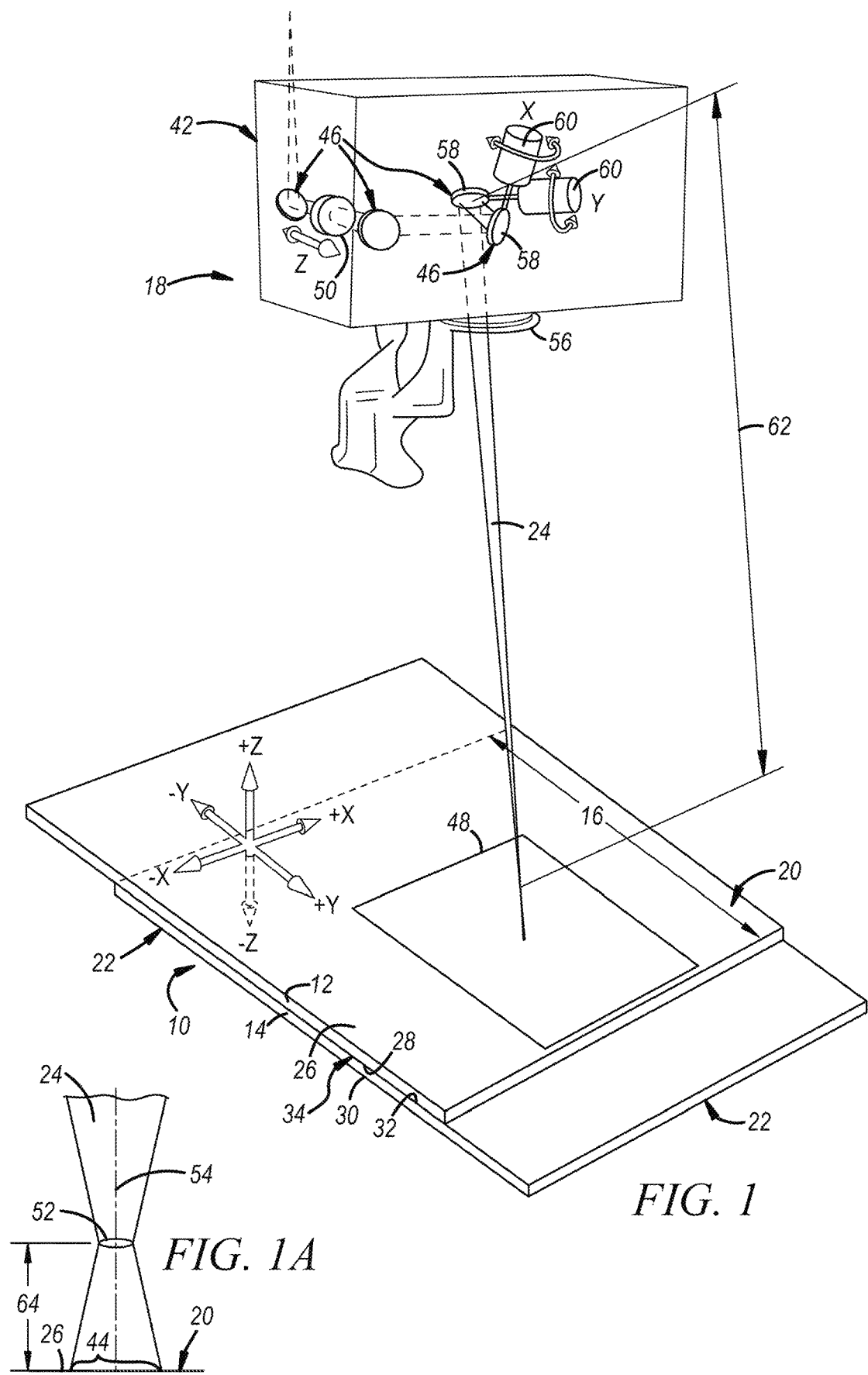
FIG. 1 is a general illustration of a workpiece stack-up that includes overlapping metal workpieces along with a remote laser welding apparatus that can carry out the disclosed method of joining together the overlapping metal workpieces.
FIG. 1A is a magnified view of the laser beam depicted in FIG. 1 showing a focal point and a longitudinal axis of a general laser beam that is representative of both the first and second laser beams employed in an embodiment of the disclosed method.

The disclosed method of joining together two or more stacked-up metal workpieces involves melting an upper portion of an already-formed laser weld joint with a laser beam. The melted upper portion includes an initial top surface of the laser weld joint, which can be somewhat coarse as a result of the dynamics involved in translating a molten metal weld pool through the workpiece stack-up and the solidification of the resultant molten workpiece material. When allowed to solidify, the melted upper portion of the laser weld joint settles and the surface tension of the momentarily-present molten metal results in a modified top surface of the laser weld joint that is smoother than the initial top surface. By providing the laser weld joint with a smoother modified top surface, which is essentially the exposed surface of the laser joint located adjacent to a top surface of the workpiece stack-up, residual stress concentration points that may be prone to crack initiation and propagation are removed and the laser weld joint is less liable to damage seal strips that may be applied over in close proximity to the joint. The smoother modified top surface also gives the laser weld joint a more aesthetically pleasing appearance.

The formation of the laser weld joint and the subsequent melting of the upper portion of the weld joint, including its top surface, can be separately performed by any type of laser welding apparatus such as, for example, a remote laser welding apparatus or a conventional laser welding apparatus. The laser beam employed to form the laser weld joint and the laser beam employed to provide the joint with a smoother modified top surface may each be a solid-state laser beam or a gas laser beam depending on the characteristics of the metal workpieces being joined and the laser welding mode (conduction, keyhole, etc.) desired to be practiced. Some notable solid-state lasers that may be used are a fiber laser, a disk laser, a direct diode laser, and a Nd:YAG laser, and a notable gas laser that may be used is a $CO_2$ laser, although other types of lasers may certainly be used. In a preferred implementation of the disclosed method, which is described below in more detail, a remote laser welding apparatus is employed to both form the laser weld joint and directly thereafter melt the upper portion of the laser weld joint. In that regard, the terms "first laser beam" and "second laser beam" are used herein to identify (1) the laser beam that forms the original laser weld joint and (2) the laser beam that melts the upper portion of the previously-formed laser weld joint, respectively, despite the fact that the same welding apparatus is transmitting each of those laser beams.

The disclosed method of joining together two or more metal workpieces can be performed on a variety of workpiece stack-up configurations. For example, the disclosed method may be used in conjunction with a "2T" workpiece stack-up (FIGS. 1-2) that includes two overlapping metal workpieces, or it may be used in conjunction with a "3T" workpiece stack-up (FIG. 3) that includes three overlapping metal workpieces. Still further, in some instances, the disclosed method may be used in conjunction with a "4T" workpiece stack-up (not shown) that includes four overlapping metal workpieces. The two or more metal workpieces included in the workpiece stack-up may all be steel workpieces, aluminum workpieces, or magnesium workpieces, and they need not necessarily have the same composition or have the same thickness as the others in the stack-up. The disclosed method is carried out in essentially the same way to achieve the same results regardless of whether the workpiece stack-up includes two overlapping metal workpieces or more than two overlapping metal workpieces. Any differences in workpiece stack-up configurations can be easily accommodated by adjusting the characteristics of the laser beams employed.

Referring now generally to FIG. 1, a workpiece stack-up 10 is shown in which the stack-up 10 includes at least a first metal workpiece 12 and a second metal workpiece 14 that overlap to define a welding region 16. A remote laser welding apparatus 18 that can perform the disclosed workpiece joining method is also shown. Within the confines of the welding region 16, the first and second metal workpieces 12, 14 provide a top surface 20 and a bottom surface 22, respectively, of the workpiece stack-up 10. The top surface 20 of the workpiece stack-up 10 is made available to the remote laser welding apparatus 18 and is accessible by a laser beam 24 emanating from the remote laser welding apparatus 18. And since only single side access is needed to conduct laser welding, there is no need for the bottom surface 22 of the workpiece stack-up 10 to be made accessible in the same way. The terms "top surface" and "bottom surface" as used herein are relative designations that identify the surface of the stack-up 10 (top surface) that is more proximate to and facing the remote laser welding apparatus 18 and the surface of the stack-up 10 (bottom surface) that is facing in the opposite direction.

The workpiece stack-up 10 may include only the first and second metal workpieces 12, 14, as shown in FIGS. 1-2. Under these circumstances, and as shown best in FIG. 2, the first metal workpiece 12 includes an exterior outer surface 26 and a first faying surface 28, and the second metal workpiece 14 includes an exterior outer surface 30 and a second faying surface 32. The exterior outer surface 26 of the first metal workpiece 12 provides the top surface 20 of the workpiece stack-up 10 and the exterior outer surface 30 of the second metal workpiece 14 provides the oppositely-facing bottom surface 22 of the stack-up 10. And, since the two metal workpieces 12, 14 are the only workpieces present in the workpiece stack-up 10, the first and second faying surfaces 28, 32 of the first and second metal workpieces 12, 14 overlap and confront within the welding region 16 to establish a faying interface 34. In other embodiments, one of which is described below in connection with FIG. 3, the workpiece stack-up 10 may include an additional third metal workpiece disposed between the first and second metal workpieces 12, 14 to provide the stack-up 10 with three metal workpieces instead of two.

The term "faying interface" is used broadly in the present disclosure and is intended to encompass a wide range of overlapping relationships between the confronting first and second faying surfaces 28, 32 of the first and second metal workpieces 12, 14 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a sealer or adhesive—and thus do not experience the type of interfacial abutment that typifies direct contact—yet are in close enough proximity that laser welding can be practiced. As another example, the faying surfaces 28, 32 may establish the faying interface 34 by being separated by imposed gaps. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the surfaces 28, 32 spaced apart outside of and around the contact points by up to 1.0 mm.

Figure 3:
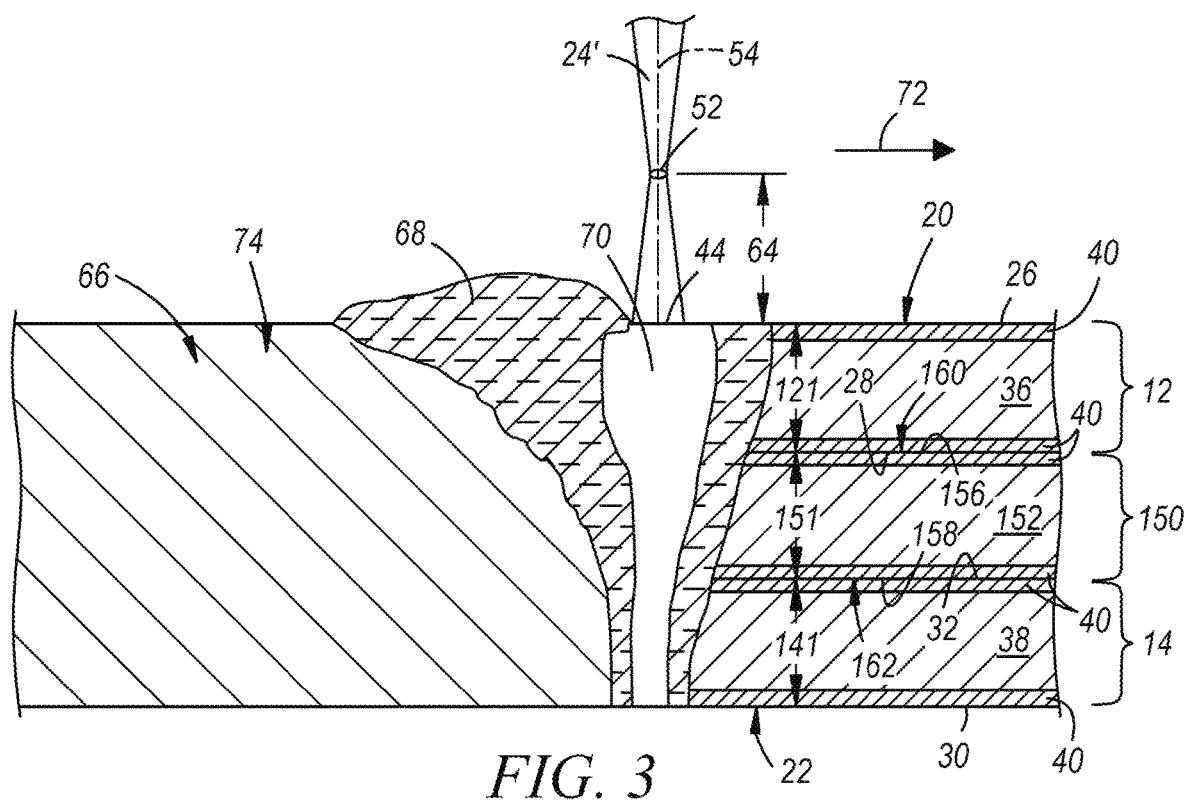
FIG. 3 is a cross-sectional view of a workpiece stack-up during the formation of a laser weld joint according to another aspect of the present disclosure in which a first laser beam is directed towards the workpiece stack-up and maneuvered relative to a top surface of the stack-up by a scanning optic laser head of a remote laser welding apparatus, and wherein the workpiece stack-up includes three overlapping metal workpieces instead of two as shown in FIG. 2.

Referring still to FIG. 3, the first metal workpiece 12 includes a first base metal substrate 36 and the second metal workpiece 14 includes a second base metal substrate 38. The first and second base metal substrates 36, 38 may all be composed of steel, aluminum, or magnesium; that is, the first and second base metal substrates 36, 38 are both composed of steel, both composed of aluminum, or both composed of magnesium. At least one of the first or second base metal substrates 36, 38 may include a surface coating 40. The surface coating(s) 40 may be employed on one or both of the base metal substrates 36, 38 for various reasons including corrosion protection, strength enhancement, and/or to improve processing, among other reasons, and the composition of the coating(s) 40 is based largely on the composition of the underlying base metal substrates 36, 38. Taking into the account the thickness of the base metal substrates 36, 38 and their optional surface coatings 40, each of a thickness 121 of the first metal workpiece 12 and a thickness 141 of the second metal workpiece 14 preferably ranges from 0.4 mm to 6.0 mm at least within the welding region 16. The thicknesses 121, 141 of the first and second metal workpieces 12, 14 may be the same or different from each other.

Each of the first and second base metal substrates 36, 38 may be coated with a surface coating 40 as shown here in FIG. 2. The surface coatings 40, in turn, provide the metal workpieces 12, 14 with their respective exterior outer surfaces 26, 30 and their respective faying surfaces 28, 32. In another embodiment, only the first base metal substrate 36 includes a surface coating 40 while the second metal substrate 36 is uncoated or bare. Under these circumstances, the surface coating 40 covering the first base metal substrate 36 provides the first metal workpiece 12 with its exterior outer and faying surfaces 26, 28, while the second base metal substrate 38 provides the second metal workpiece 14 with its exterior outer and faying surfaces 30, 32. In yet another embodiment, only the second base metal substrate 38 includes the surface coating 40 while the first base metal substrate 36 is uncoated or bare. Consequently, in this case, the first base metal substrate 36 provides the first metal workpiece 12 with its exterior outer and faying surfaces 26, 28, while the surface coating 40 covering the second base metal substrate 38 provides the second metal workpiece 14 with its exterior outer and faying surfaces 30, 32.

The base metal substrates 36, 38 may assume any of a wide variety of metal forms and compositions that fall within the broadly-recited base metal groups of steel, aluminum, and magnesium. For instance, if composed of steel, each of the base metal substrates 36, 38 (referred to for the moment as the first and second base steel substrates 36, 38) may be separately composed of any of a wide variety of steels including a low carbon (mild) steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the workpiece(s) 12, 14 include press-hardened steel (PHS). Moreover, each of the first and second base steel substrates 36, 38 may have been treated to obtain a particular set of mechanical properties, including being subjected to heat-treatment processes such as annealing, quenching, and/or tempering. The first and second base steel substrates 36, 38 may be hot or cold rolled to their final thicknesses and may be pre-fabricated to have a particular profile suitable for assembly into the workpiece stack-up 10.

The surface coating 40 present on one or both of the base steel substrates 36, 38 is preferably comprised of a zinc-based material or an aluminum-based material. Some examples of a zinc-based material include zinc or a zinc alloy such as a zinc-nickel alloy or a zinc-iron alloy. One particularly preferred zinc-iron alloy that may be employed has a bulk average composition that includes 8 wt % to 12 wt % iron and 0.5 wt % to 4 wt % aluminum with the balance (in wt %) being zinc. A coating of a zinc-based material may be applied by hot-dip galvanizing (hot-dip galvanized zinc coating), electrogalvanizing (electrogalvanized zinc coating), or galvannealing (galvanneal zinc-iron alloy), typically to a thickness of between 2 μm to 50 μm, although other procedures and thicknesses of the attained coating(s) may be employed. Some examples of a suitable aluminum-based material include aluminum, an aluminum-silicon alloy, an aluminum-zinc alloy, and an aluminum-magnesium alloy. A coating of an aluminum-based material may be applied by dip coating, typically to a thickness of 2 μm to 30 μm, although other coating procedures and thicknesses of the attained coating(s) may be employed. Taking into the account the thicknesses of the base steel substrates 36, 38 and their surface coating(s) 40, if present, the overall thickness of each of the first and second steel workpieces 12, 14 preferably ranges from 0.4 mm to 4.0 mm, or more narrowly from 0.5 mm to 2.0 mm, at least through the welding region 16.

If the first and second base metal substrates 36, 38 are composed of aluminum, each of the base metal substrates 36, 38 (referred to for the moment as the first and second base aluminum substrates 36, 38) may be separately composed of unalloyed aluminum or an aluminum alloy that includes at least 85 wt % aluminum. Some notable aluminum alloys that may constitute the first and/or second base aluminum substrates 36, 38 are an aluminum-magnesium alloy, an aluminum-silicon alloy, an aluminum-magnesium-silicon alloy, or an aluminum-zinc alloy. Additionally, each of the base aluminum substrates 36, 38 may be separately provided in wrought or cast form. For example, each of the base aluminum substrates 36, 38 may be composed of a 4xxx, 5xxx, 6xxx, or 7xxx series wrought aluminum alloy sheet layer, extrusion, forging, or other worked article, or a 4xx.x, 5xx.x, or 7xx.x series aluminum alloy casting. Some more specific kinds of aluminum alloys that can be used as the first and/or second base aluminum substrates 36, 38 include AA5182 and AA5754 aluminum-magnesium alloy, AA6011 and AA6022 aluminum-magnesium-silicon alloy, AA7003 and AA7055 aluminum-zinc alloy, and Al-10Si—Mg aluminum die casting alloy. The first and/or second base aluminum substrates 36, 38 may be employed in a variety of tempers including annealed (O), strain hardened (H), and solution heat treated (T).

The surface coating 40 present on one or both of the base aluminum substrates 36, 38 may be a native refractory oxide coating comprised of aluminum oxide compounds that forms passively when fresh aluminum from the base aluminum substrate 36, 38 is exposed to atmospheric air or some other oxygen-containing medium. The surface coating 40 may also be a metallic coating comprised of zinc or tin, or it may be a metal oxide conversion coating comprised of oxides of titanium, zirconium, chromium, or silicon as disclosed in U.S. Patent Application No. US2014/0360986. A typical thickness of the surface coating 40, if present, lies anywhere from 1 nm to 10 μm depending on the composition of the coating 40 and the manner in which the coating 40 is derived, although other thicknesses may be employed. Passively formed refractory oxide coatings, for example, often have thicknesses that range from 2 nm to 10 nm when the underlying aluminum material is an aluminum alloy. Taking into account the thicknesses of the base aluminum substrates 36, 38 and their surface coating(s) 40, if present, the overall thickness of each of the first and second aluminum workpieces 12, 14 preferably ranges of 0.4 mm to 6.0 mm, or more narrowly from 0.5 mm to 3.0 mm, at least through the welding region 16.

If the first and second base metal substrates 36, 38 are composed of magnesium, each of the base metal substrates 36, 38 (referred to for the moment as the first and second base magnesium substrates 36, 38) may be separately composed of unalloyed magnesium or a magnesium alloy that includes at least 85 wt % magnesium. Some notable magnesium alloys that may constitute the first and/or second base magnesium substrates 36, 38 are a magnesium-zinc alloy, a magnesium-aluminum alloy, a magnesium-aluminum-zinc alloy, a magnesium-aluminum-silicon alloy, and a magnesium-rare earth alloy. Additionally, each of the base magnesium substrates 36, 38 may be separately provided in wrought (sheet, extrusion, forging, or other worked article) or cast form. A few specific examples of magnesium alloys that can be used as the first and/or second base magnesium substrates 36, 38 include, but are not limited to, AZ91D die cast or wrought (extruded or sheet) magnesium alloy, AZ31B die cast or extruded (extruded or sheet) magnesium alloy, and AM60B die cast magnesium alloy. The first and/or second base magnesium substrates 36, 38 may be employed in a variety of tempers including annealed (O), strain hardened (H), and solution heat treated (W).

The surface coating 40 present on one or both of the base magnesium substrates 36, 38 may be a native refractory oxide coating comprised of magnesium oxide compounds (and possibly magnesium hydroxide compounds) that forms passively when fresh magnesium from the base magnesium substrate 36, 38 is exposed to atmospheric air or some other oxygen-containing medium. The surface coating 40 may also be a metallic conversion coating comprised of metal oxides, metal phosphates, or metal chromates. A typical thickness of the surface coating 40, if present, lies anywhere from 1 nm to 10 µm depending on the composition of the coating 40 and the manner in which the coating 40 is derived, although other thicknesses may be employed. Passively formed refractory oxide coatings, for example, often have thicknesses that range from 2 nm to 10 nm when the underlying magnesium material is a magnesium alloy. Taking into account the thicknesses of the base magnesium substrates 36, 38 and their surface coating(s) 40, if present, the overall thickness of each of the first and second magnesium workpieces 12, 14 preferably ranges of 0.4 mm to 6.0 mm, or more narrowly from 0.5 mm to 3.0 mm, at least through the welding region 16.

FIGS. 1-2 illustrate an embodiment of the workpiece stack-up 10 that includes two overlapping metal workpieces 12, 14 establishing a single faying interface 34. Of course, as shown in FIG. 3, the workpiece stack-up 10 may include an additional third metal workpiece 150, with a thickness 151, situated between the first and second metal workpieces 12, 14. The third metal workpiece 150, if present, includes a third base metal substrate 152 that may be bare or coated with a surface coating 40 (as shown). The third metal workpiece 150 is similar in many general respects to the first and second metal workpieces 12, 14 and, accordingly, the description of the first and second metal workpieces 12, 14 set forth above (in particular the composition of the base metal substrates, their possible surface coatings, and the workpiece thicknesses) applies fully to the third metal workpiece 150. The welding region 16 in this embodiment of the workpiece stack-up 10 is now defined by the extent of the common overlap of all of the first, second, and third metal workpieces 12, 14, 150.

As a result of stacking the first, second, and third metal workpieces 12, 14, 150 in overlapping fashion to provide the workpiece stack-up 10, the third metal workpiece 40 has two faying surfaces: a third faying surface 156 and a fourth faying surface 158. The third faying surface 156 overlaps and confronts the first faying surface 28 of the first metal workpiece 12 and the fourth faying surface 158 overlaps and confronts the second faying surface 32 of the second metal workpiece 14. Within the welding region 16, the confronting first and third faying surfaces 28, 156 of the first and third metal workpieces 12, 150 establish a first faying interface 160 and the confronting second and fourth faying surfaces 32, 158 of the second and third metal workpieces 14, 150 establish a second faying interface 162. These faying interfaces 160, 162 are the same type and encompass the same attributes as the faying interface 34 described above with respect to FIGS. 1-2. Consequently, in this embodiment, the exterior outer surfaces 26, 30 of the flanking first and second metal workpieces 12, 14 still face away from each other in opposite directions and constitute the top and bottom surfaces 20, 22 of the workpiece stack-up 10.

Referring back to FIG. 1, the remote laser welding apparatus 18 includes a scanning optic laser head 42. Generally speaking, the scanning optic laser head 42 directs the transmission of the laser beam 24 towards the top surface 20 of the workpiece stack-up 10 (also the exterior outer surface 26 of the first metal workpiece 12). The directed laser beam 24 has a beam spot 44, which, as shown in FIG. 1A, is the sectional area of the laser beam 24 at a plane oriented along the top surface 20 of the stack-up 10. The scanning optic laser head 42 is preferably mounted to a robotic arm (not shown) that can quickly and accurately carry the laser head 42 to many different preselected sites within the welding region 16 in rapid programmed succession. The laser beam 24 used in conjunction with the scanning optic laser head 42 is preferably a solid-state laser beam operating with a wavelength in the near-infrared range (commonly considered to be 700 nm to 1400 nm) of the electromagnetic spectrum. Additionally, the laser beam 24 has a power level capability that can attain a power density sufficient to produce a keyhole, if desired, within the workpiece stack-up 10 during formation of the laser weld joint. The power density needed to produce a keyhole within the overlapping metal workpieces 12, 14 (and possibly 150) is typically in the range of 0.5-1.5 MW/cm$^2$.

Some examples of a suitable solid-state laser beam that may be used in conjunction with the remote laser welding apparatus 18 include a fiber laser beam, a disk laser beam, and a direct diode laser beam. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS). Laser generators that can generate each of those types of lasers as well as other variations are commercially available. Other solid-state laser beams not specifically mentioned here may of course be used.

The scanning optic laser head 42 includes an arrangement of mirrors 46 that can maneuver the laser beam 24 and thus convey the beam spot 44 along the top surface 20 of the workpiece stack-up 10 within an operating envelope 48 that at least partially spans the welding region 16. Here, as illustrated in FIG. 1, the portion of the top surface 20 spanned by the operating envelope 48 is labeled the x-y plane since the position of the laser beam 24 within the plane is identified by the "x" and "y" coordinates of a three-dimensional coordinate system. In addition to the arrangement of mirrors 46, the scanning optic laser head 42 also includes a z-axis focal lens 50, which can move a focal point 52 (FIG. 1A) of the laser beam 24 along a longitudinal axis 54 of the laser beam 24 to thus vary the location of the focal point 52 in a z-direction oriented perpendicular to the x-y plane in the three-dimensional coordinate system established in FIG. 1. Furthermore, to keep dirt and debris from adversely affecting the optical system components and the integrity of the laser beam 24, a cover slide 56 may be situated below the scanning optic laser head 42. The cover slide 56 protects the arrangement of mirrors 46 and the z-axis focal lens 50 from the surrounding environment yet allows the laser beam 24 to pass out of the scanning optic laser head 42 without substantial disruption.

The arrangement of mirrors 46 and the z-axis focal lens 50 cooperate during operation of the remote laser welding apparatus 18 to dictate the desired movement of the laser beam 24 and its beam spot 44 within the operating envelope 48 as well as the position of the focal point 52 along the longitudinal axis 54 of the beam 24. The arrangement of mirrors 46, more specifically, includes a pair of tiltable scanning mirrors 58. Each of the tiltable scanning mirrors 58 is mounted on a galvanometer 60. The two tiltable scanning mirrors 58 can move the location of the beam spot 44—and thus change the point at which the laser beam 24 impinges the top surface 20 of the workpiece stack-up 10—anywhere in the x-y plane of the operating envelope 48 through precise coordinated tilting movements executed by the galvanometers 60. At the same time, the z-axis focal lens 50 controls the location of the focal point 52 of the laser beam 24 in order to help administer the laser beam 24 at the correct power density and to attain the desired heat input both instantaneously and over time. All of these optical components 50, 58 can be rapidly indexed in a matter of milliseconds or less to advance the beam spot 44 of the laser beam 24 relative to the x-y plane of the top surface 20 of the workpiece stack-up 10 along a beam travel pattern of simple or complex geometry while controlling the location of the focal point 52.

A characteristic that differentiates remote laser welding from other conventional forms of laser welding is the focal length of the laser beam 24. Here, as shown in best in FIG. 1, the laser beam 24 has a focal length 62, which is measured as the distance between the focal point 52 and the last tiltable scanning mirror 58 that intercepts and reflects the laser beam 24 prior to the laser beam 24 exiting the scanning optic laser head 42. The focal length 62 of the laser beam 24 is preferably in the range of 0.4 meters to 2.0 meters with a diameter of the focal point 52 typically ranging anywhere from 100 μm to 700 μm. The focal length, as well as a focal distance 64, can be easily adjusted. The term "focal distance" as used herein refers to the distance between the focal point 52 of the laser beam 24 and the top surface 20 of the workpiece stack-up 10 along the longitudinal axis 54 of the beam 24, as shown best in FIG. 1A. The focal distance 64 of the laser beam 24 is thus zero when the focal point 52 is positioned at the top surface 20 of the stack-up 10. Likewise, the focal distance is a positive distance value (+) when the focal point 52 is positioned above the top surface 20 and a negative distance value (−) when positioned below the top surface 20.

It should be noted that the laser beam 24 shown in FIG. 1 and the above accompanying text describing the laser beam 24 are intended to be generally representative in an effort to aid in the description of the remote laser welding apparatus 18. In practices of the disclose method of joining metal workpieces, as will be described in more detail below, the laser beam 24 is operated sequentially in time as a first laser beam (numeral 24' in FIGS. 2-3), which originally forms a laser weld joint, and then as a second laser beam (numeral 24" in FIG. 7), which melts an upper portion of the laser weld joint to provide the joint with a smoother modified top surface. To that end, the designation of the laser beams as "first" and "second" below is not necessarily intended to indicate a difference in laser beam type—although such distinctions are not foreclosed in other alternative embodiments where the first and second laser beams are transmitted from different apparatus—but rather is meant to specify the sequence in which the laser beams are transmitted and to differentiate between their intended functions (i.e., form the laser weld joint or melt the upper portion of the previously-formed joint). The laser beam identified by reference numeral 24 is thus indicative of how each of the first and second laser beams are delivered and maneuvered by the remote laser welding apparatus 18.

In the presently disclosed joining method, and referring now to FIGS. 2-3, a laser weld joint 66 is formed in the workpiece stack-up 10 by momentarily melting portions of the metal workpieces 12, 14 with a first laser beam 24'. To form the laser weld joint 66, the first laser beam 24' is directed by the scanning optic laser head 42 at top surface 20 of the workpiece stack-up at a predetermined weld site within the welding region 16. The resultant impingement of the top surface 20 of the stack-up 10 by the first laser beam 24' creates a molten metal weld pool 68 within the stack-up 10 that penetrates into the stack-up 10 from the top surface 20 towards the bottom surface 22 and that intersects at least one faying interface. For instance, in the 2T stack-up shown in FIG. 2, the molten metal weld pool 68 intersects the faying interface 34 between the metal workpieces 12, 14 and may fully or partially penetrate the workpiece stack-up 10. Similarly, in the 3T stack-up shown in FIG. 3, the molten metal weld pool 68 intersects at least the first faying interface 160, and in many instances both faying interfaces 162, and may fully or partially penetrate the workpiece stack-up 10. A fully penetrating molten metal weld pool 68 penetrates entirely through the workpiece stack-up 10 and breaches the bottom surface 22, as shown, while a partially penetrating molten metal weld pool 68 penetrates to some intermediate depth and therefore does not breach the bottom surface 22 of the workpiece stack-up 10.

The first laser beam 24', moreover, preferably has a power density sufficient to vaporize the workpiece stack-up 10 directly beneath the beam spot 44. This vaporizing action produces a keyhole 70, also depicted in FIGS. 2-3, which is a column of vaporized workpiece metal that oftentimes contains plasma. The keyhole 70 is formed within the molten metal weld pool 68 and exerts an outwardly-directed vapor pressure sufficient to prevent the surrounding molten metal weld pool 68 from collapsing inward. And, like the molten metal weld pool 68, the keyhole 70 also penetrates into the workpiece stack-up 10 from the top surface 20 towards the bottom surface 22 and intersects the faying interface 34 (or the first and/or second faying interfaces 160, 162) established between the first and second metal workpieces 12, 14 (or the first, second, and third metal workpieces 12, 150, 14). The keyhole 70 provides a conduit for the first laser beam 24' to deliver energy down into the workpiece stack-up 10, thus facilitating relatively deep and narrow penetration of the molten metal weld pool 68 into the workpiece stack-up 10 and a relatively small surrounding heat-affected zone. The keyhole 70 may fully (as shown) or partially penetrate the workpiece stack-up 10 along with the molten metal weld pool 68.

Upon creating the molten metal weld pool 68 and preferably the keyhole 70, the beam spot 44 of the first laser beam 24' is advanced in a forward direction 72 relative to the top surface 20 of the workpiece stack-up 10 in the x-y plane of the operating envelope 48 along a beam travel pattern. The beam travel pattern may include one or more weld paths as projected onto the top surface 20 such as, for example, any of the patterns shown in PCT/CN2016/106914, PCT/CN2016/102669, PCT/CN2016/083112, PCT/CN2015/094003, PCT/CN2015/088569, and PCT/CN2015/088563, to name but a few possibilities. The advancement of the beam spot 44 of the first laser beam 24' along the beam travel pattern is managed by precisely controlling the coordinated movements of the tiltable scanning mirrors 58 within the scanning optic laser head 42. As the beam spot 44 of the first laser beam 24' is being advanced along the beam travel pattern, the molten metal weld pool 68 (along with the keyhole 70, if present) is translated along a corresponding route within the workpiece stack-up 10. This causes the penetrating molten metal weld pool 68 to flow around and behind the beam spot 44 within the workpiece stack-up 10, resulting in the molten metal weld pool 70 elongating in the wake of the advancing progression of the first laser beam 24'.

Once the beam spot 44 of the first laser beam 24' has finished tracing the beam travel pattern 66, the transmission of the first laser beam 24' is halted and the molten workpiece material produced by the first laser beam 24' cools and solidifies into resolidified composite workpiece material 74. The resolidified composite workpiece material 74 is derived from each of the metal workpieces 12, 14 (or 12, 150, 14) penetrated by the molten metal weld pool 68 and its composition (as well as the composition of the prior-created molten metal weld pool 68) is determined by the compositions of the penetrated metal workpieces. The collective resolidified composite workpiece material 74 obtained from the first laser beam 24' constitutes the laser weld joint 66, which may extend fully through or partially into the workpiece stack-up 10, depending on whether the molten metal weld pool 68 fully or partially penetrated the stack-up 10, and may be surrounded by a heat-affected zone (HAZ). The laser weld joint 66 thus extends into the workpiece stack-up 10 from the top surface 20 of the stack-up 10 towards the bottom surface 22 while intersecting the faying interface 34 (or the first and/or second faying interfaces 162, 164) so as to autogenously fusion weld the affected metal workpieces 12, 14 (or 12, 150, 14) together.

Figure 6:
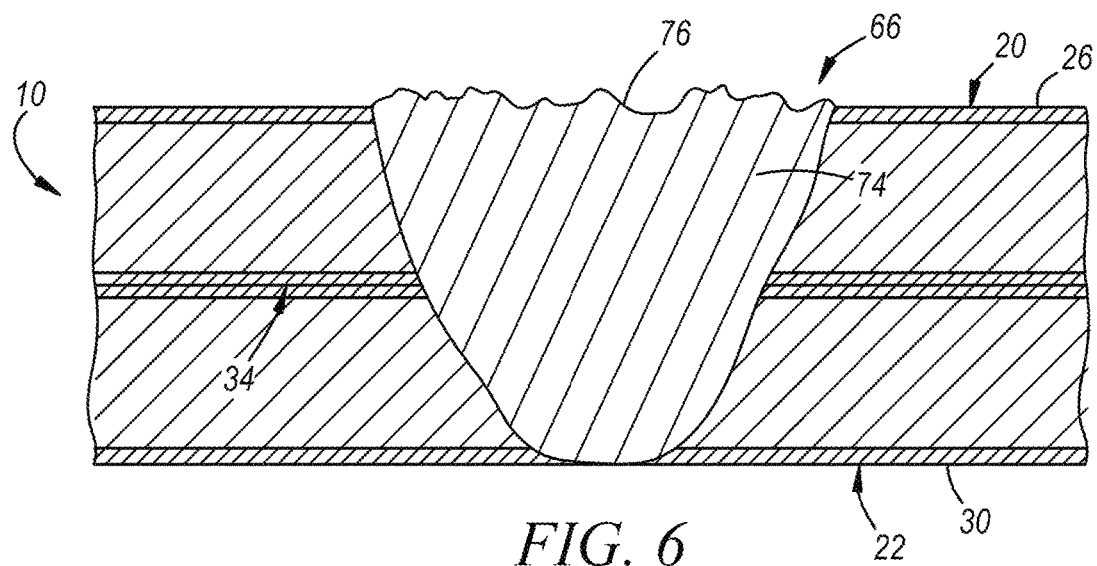
FIG. 6 is a generalized cross-sectional view of the laser weld joint produced by the first laser beam according to one aspect of the present disclosure and which is representative of the spot and seam laser weld joints shown in FIGS. 4-5, wherein the laser weld joint has an initial top surface.

The laser weld joint 66 can assume a variety of shapes and structures depending on the geometry of the beam travel pattern that is traced by the first laser beam 24' along the top surface 20 of the workpiece stack-up 10. For example, as shown in FIG. 4, the laser weld joint 66 may be constructed as a laser spot weld joint, which is a consolidated nugget of resolidified composite workpiece material 74 that may be formed by maneuvering the first laser beam 24' along a beam travel pattern comprised of a spiral weld path or a series of concentric circular or elliptical weld paths such that the molten metal weld pool 68 essentially grows into a larger melt puddle. In another example, as shown in FIG. 5, the laser weld joint 66 may be constructed as a laser seam weld joint, which is a trail of resolidified composite workpiece material 74 formed by a single pass of the first laser beam 24' in either a linear weld path (as shown) or a nonlinear weld path such as a C-shaped "staple" path or a single circular or elliptical weld path having a large enough diameter that a central non-welded portion exists within the circular or elliptical trail of resolidified composite workpiece material 74. Regardless of its shape and structure, the laser weld joint 66 has an initial top surface 76 that is adjacent to the top surface 20 of the workpiece stack-up 10, as shown in the generalized and representative cross-sectional view of the laser weld joint 66 depicted in FIG. 6.

The initial top surface 76 of the laser weld joint 66 has a tendency to be somewhat coarse due at least in part to the turbulence produced in the molten metal weld pool 68 during the laser welding process and the tendency for gasses to be trapped within the weld pool 68. The initial top surface has a surface roughness, which is measured as a mean or arithmetic average roughness (Ra), that in many instances, but not necessarily all, ranges from 5 µm to 10 µm. An overly roughened or disturbed initial top surface 76 can have several adverse effects on the visual appearance and/or the structural integrity of the laser weld joint 66. A coarse initial top surface 76 of the laser weld joint 66 may give the perception of a poor-quality joint even though the weld joint 66 is in fact structurally and functionally sound. Additionally, a coarse initial top surface 76 may create points of residual stress concentration that are susceptible to cracking and, in particular, stress corrosion cracking when the joint 66 is subjected to a tensile load in a corrosive environment. Still further, a coarse initial top surface 76 of the laser weld joint 66 may damage seal strips that are applied over the joint 66 in subsequent manufacturing operations.

Figure 7:
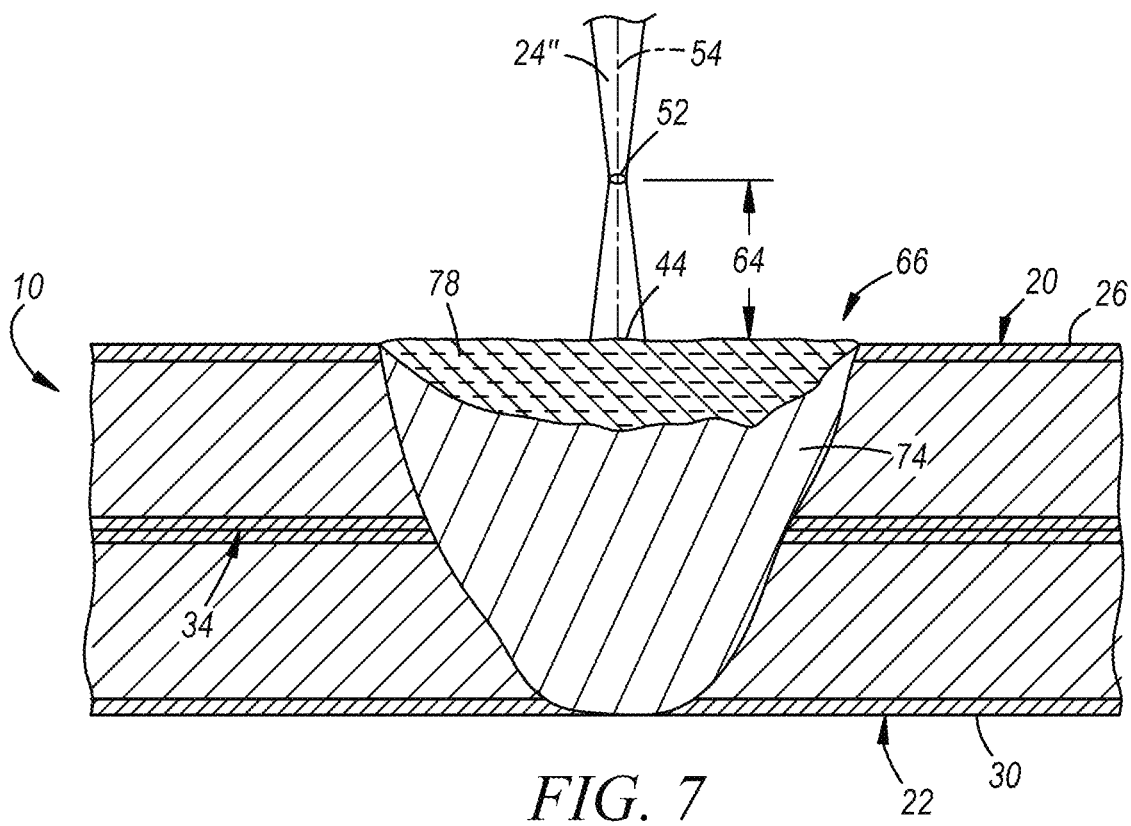
FIG. 7 is a generalized cross-sectional view of the laser weld joint, which was previously produced by the first laser beam according to one aspect of the present disclosure, along with a second laser beam which is impinging the initial top surface of the laser weld joint and being moved relative to the initial top surface to melt an upper portion of the laser weld joint including the initial top surface.

To address the potential adverse effects associated with a coarse initial top surface 76 of the laser weld joint 66, the disclosed method calls for impinging the initial top surface 76 of the laser weld joint 66 with a second laser beam 24", which is also directed towards the stack-up 10 by the scanning optic laser head 42, and then moving the second laser beam 24", and in particular its beam spot 44, along the initial top surface 76 melt an upper portion 78 of the laser weld joint 66. The melting of the upper portion 78 of the laser weld joint 66 by the second laser beam 24" is depicted in FIG. 7. The melted upper portion 78 of the laser weld joint 66 extends partially into the weld joint 66 and consumes the initial top surface 76 of the weld joint 66; that is, at least 85% of the initial top surface 76 is melted and, preferably, all of the initial top surface 76 is melted, with acceptable unmelted portions of the initial top surface 76, if any at all, typically being confined to peripheral border regions alongside the interface between the weld joint 66 and the surrounding workpiece stack-up 10. The size and proportion of the melted upper portion 78 of the laser weld joint 66 relative to the rest of the joint 66 can vary depending on the size, shape, and structure of the joint 66 as originally formed. In many instances, though, the upper portion 78 of the laser weld joint 66 that is melted by the second laser beam 24" constitutes between 10 vol % and 30 vol % of the laser weld joint 66.

The second laser beam 24" may be moved along the initial top surface 76 of the laser weld joint 66 in a beam travel pattern 80 that covers at least the area of the initial top surface 76. For example, when the laser weld joint 66 is a laser spot weld joint, the beam spot 44 of the second laser beam 24" may be advanced along a beam travel pattern 80 projected onto the initial top surface 76 that is comprised of a spiral weld path, as shown in FIG. 4, although other beam travel patterns such as those that include a series of concentric circular or elliptical weld paths may also be employed. As another example, when the laser weld joint 66 is a laser seam weld joint, the beam spot 44 of the second laser beam 24" may be advanced along a beam travel pattern 80 projected onto the initial top surface 76 that is comprised of a single continuous sinusoidal weld path, as shown in FIG. 5, although other beam travel patterns such as those that include a zig-zag weld path or a looping weld path may also be employed. As for the characteristics of the second laser beam 24", they may be different from those of the first laser beam 24" given that the second laser beam 24" is intended only to partially melt the laser weld joint 66. To be sure, in many typical applications, the first laser beam 24" may have a power level of 2 kW to 6 kW and a focal position of +10 mm to −10 mm while being advanced along its beam travel pattern at a travel speed of 2 m/min to 50 m/min, while the second laser beam 24" may have a power level of 1 kW to 3 kW and a focal position of 0 mm to −50 mm while being advanced along its beam travel pattern 80 at a travel speed of 50 m/min to 130 m/min.

Figure 8:
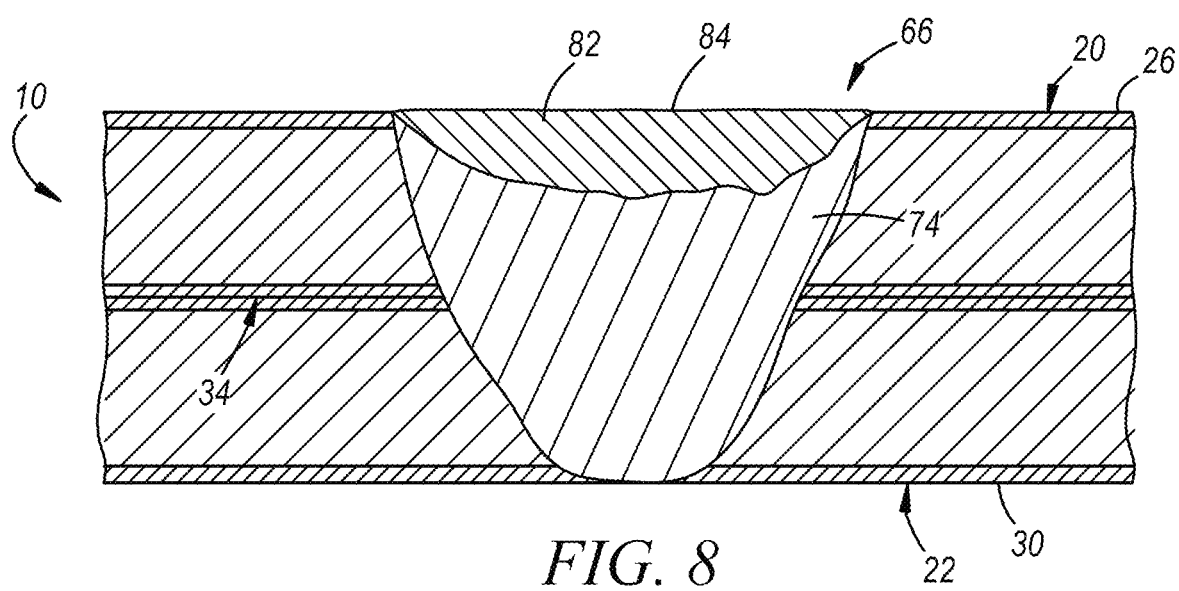
FIG. 8 is a generalized cross-sectional view of the laser weld joint after the melted upper portion of the weld joint has been allowed to resolidify to provide the laser weld joint with a modified top surface that is smoother than the initial top surface of the originally-formed laser weld joint.

After the upper portion 78 of the laser weld joint 66 has been melted, the second laser beam 24" is removed from the laser weld joint 66 to allow the melted upper portion 78 to resolidify into a glossy cap 82, as illustrated in FIG. 8. Removal of the second laser beam 24" from the laser weld joint 66 may involve halting transmission of the second laser beam 24 or simply moving the second laser beam 24" off of and away from the laser weld joint 66. When allowed to resolidify into the glossy cap 82 from a momentary melted state, the upper portion 78 of the laser weld joint 66 settles and the surface tension of the momentarily-present molten metal results in a modified top surface 84 of the laser weld joint 66 that is smoother than the initial top surface 76, as shown generally in FIG. 8. The modified top surface 84 has a surface roughness, which, like before, is measured as a mean or arithmetic average roughness (Ra), that in many instances, but not necessarily all, ranges from 0.5 µm to 3 µm. Not only does the smoother modified top surface 84 have a more aesthetically pleasing appearance than the initial top surface 76 of the laser weld joint 66, but it also removes residual stress concentration points that may be prone to crack initiation and propagation and renders the joint 66 less liable to damage seal strips that may be applied.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method comprising:
   providing a workpiece stack-up that includes two or more metal workpieces that overlap to define a welding region, the welding region of the workpiece stack-up having a top surface and a bottom surface and further establishing a faying interface between each pair of adjacent metal workpieces included in the workpiece stack-up;
   directing a first laser beam at the top surface of the workpiece stack-up to create a molten metal weld pool that penetrates into the workpiece stack-up from the top surface of the stack-up towards the bottom surface of the stack-up and intersects the at least one faying interface established between the top and bottom surfaces of the workpiece stack-up;
   advancing a beam spot of the first laser beam relative to the top surface of the workpiece stack-up along a beam travel pattern to translate the molten metal weld pool along a corresponding route within the workpiece stack-up to form a laser weld joint comprised of resolidified composite workpiece material derived from each of the metal workpieces penetrated by the molten metal weld pool, the laser weld joint having an initial top surface adjacent to the top surface of the workpiece stack-up;
   impinging the laser weld joint with a second laser beam and moving the second laser beam along the initial top surface of the laser weld joint to melt an upper portion of the laser weld joint including the initial top surface of the laser weld joint; and
   removing the second laser beam from the laser weld joint to allow the upper portion of the laser weld joint to resolidify and provide the laser weld joint with a modified top surface that is smoother than the initial top surface of the laser weld joint.

2. The method set forth in claim 1, wherein the workpiece stack-up includes two or three overlapping metal workpieces.

3. The method set forth in claim 2, wherein each of the two or three overlapping metal workpieces is a steel workpiece.

4. The method set forth in claim 2, wherein each of the two or three overlapping metal workpieces is an aluminum workpiece.

5. The method set forth in claim 1, wherein the laser weld joint is a laser spot weld joint.

6. The method set forth in claim 1, wherein the laser weld joint is a laser seam weld joint.

7. The method set forth in claim 1, wherein the initial top surface of the laser weld joint has a surface roughness (Ra) of 5 µm to 10 µm, and wherein the surface roughness of the modified top surface of the laser weld joint has a surface roughness (Ra) of 0.5 µm to 3 µm.

8. The method set forth in claim 1, wherein the first laser beam is a solid-state laser beam, and wherein moving the first laser beam along the initial top surface of the laser weld joint is performed by a remote laser welding apparatus.

9. The method set forth in claim 8, wherein the first laser beam is moved along the initial top surface of the laser weld joint at a travel speed that ranges from 50 m/min to 130 m/min.

10. The method set forth in claim 9, wherein the first laser beam has a power level ranging from 1 kW to 3 kW and a focal position of 0 mm to −50 mm relative to the top surface of the workpiece stack-up when the first laser beam is being moved along the initial top surface of the laser weld joint.

11. The method set forth in claim 1, wherein the upper portion that is melted by the first laser beam constitutes between 10 vol % and 30 vol % of the laser weld joint.

12. A method comprising:
   providing a workpiece stack-up that includes two or more metal workpieces that overlap to define a welding region, the welding region of the workpiece stack-up having a top surface and a bottom surface and further establishing a faying interface between each pair of adjacent metal workpieces included in the workpiece stack-up, and wherein all of the two or more metal workpieces in the workpiece stack-up are steel workpieces, aluminum workpieces, or magnesium workpieces;
   directing a first laser beam at the top surface of the workpiece stack-up to create a molten metal weld pool that penetrates into the workpiece stack-up from the top surface of the stack-up towards the bottom surface of the stack-up and intersects the at least one faying interface established between the top and bottom surfaces of the workpiece stack-up;
   advancing a beam spot of the first laser beam relative to the top surface of the workpiece stack-up along a beam travel pattern to translate the molten metal weld pool along a corresponding route within the workpiece stack-up to form a laser weld joint comprised of resolidified composite workpiece material derived from each of the metal workpieces penetrated by the molten metal weld pool, the laser weld joint having an initial top surface adjacent to the top surface of the workpiece stack-up;
   impinging the laser weld joint with a second laser beam and moving the second laser beam along the initial top surface of the laser weld joint to melt an upper portion of the laser weld joint including the initial top surface of the laser weld joint; and removing the second laser beam from the laser weld joint to allow the upper portion of the laser weld joint to resolidify and provide the laser weld joint with a modified top surface that is smoother than the initial top surface of the laser weld joint.

13. The method set forth in claim 12, wherein the workpiece stack-up includes two or three overlapping metal workpieces.

14. The method set forth in claim 12, wherein the initial top surface of the laser weld joint has a surface roughness (Ra) of 5 µm to 10 µm, and wherein the surface roughness of the modified top surface of the laser weld joint has a surface roughness (Ra) of 0.5 µm to 3 µm.

15. The method set forth in claim 12, wherein the second laser beam is a solid-state laser beam, wherein moving the second laser beam along the initial top surface of the laser weld joint is performed by a remote laser welding apparatus, and wherein the second laser beam is moved along the initial top surface of the laser weld joint at a travel speed that ranges from 50 m/min to 13 m/min while a power level of the second laser beam ranges from 1 kW to 3 kW and a focal position of the second laser beam ranges from 0 mm to −50 mm.

16. A method comprising:
providing a workpiece stack-up that includes two or three metal workpieces that overlap to define a welding region, the welding region of the workpiece stack-up having a top surface and a bottom surface and further establishing a faying interface between each pair of adjacent metal workpieces included in the workpiece stack-up, and wherein all of the two or more metal workpieces in the workpiece stack-up are steel workpieces, aluminum workpieces, or magnesium workpieces;
operating a scanning optic laser head of a remote laser welding apparatus to direct a first laser beam at the top surface of the workpiece stack-up and, additionally, to move a beam spot of the first laser beam relative to the top surface of the workpiece stack-up within the welding region and along a beam travel pattern to translate a keyhole and a surrounding molten metal weld pool along a corresponding route within the workpiece stack-up, the translation of the keyhole and the surrounding molten metal weld pool forming a laser weld joint that extends into the workpiece stack-up and intersects each faying interface established between the top and bottom surfaces of the workpiece stack-up to fusion weld the two or three metal workpieces together, the laser weld joint having an initial top surface adjacent to the top surface of the workpiece stack-up;
operating the scanning optic laser head of the remote laser welding apparatus to impinge the initial top surface of the laser weld joint with a second laser beam and, additionally, to move the second laser beam along the initial top surface of the laser weld joint to melt an upper portion of the laser weld joint including the initial top surface of the laser weld joint, the upper portion that is melted by the second laser beam constituting between 10 vol % and 30 vol % of the laser weld joint; and
removing the second laser beam from the laser weld joint to allow the upper portion of the laser weld joint to resolidify and provide the laser weld joint with a modified top surface that is smoother than the initial top surface of the laser weld joint.

17. The method set forth in claim 16, wherein the first laser beam is a solid-state laser beam, wherein the first laser beam is moved relative to the top surface of the workpiece stack-up along the beam travel pattern at a travel speed that ranges from 2 m/min to 50 m/min while a power level of the first laser beam ranges from 2 kW to 6 kW and a focal position of the first laser beam ranges from +10 mm to −10 mm.

18. The method set forth in claim 16, wherein the second laser beam is a solid-state laser beam, wherein the second laser beam is moved along the initial top surface of the laser weld joint at a travel speed that ranges from 50 m/min to 130 m/min while a power level of the second laser beam ranges from 1 kW to 3 kW and a focal position of the second laser beam ranges from 0 mm to −50 mm.

* * * * *